May 19, 1936.  P. G. JACOBSON  2,041,186
ELECTROSTATIC CONDENSER
Filed March 14, 1932   2 Sheets-Sheet 1
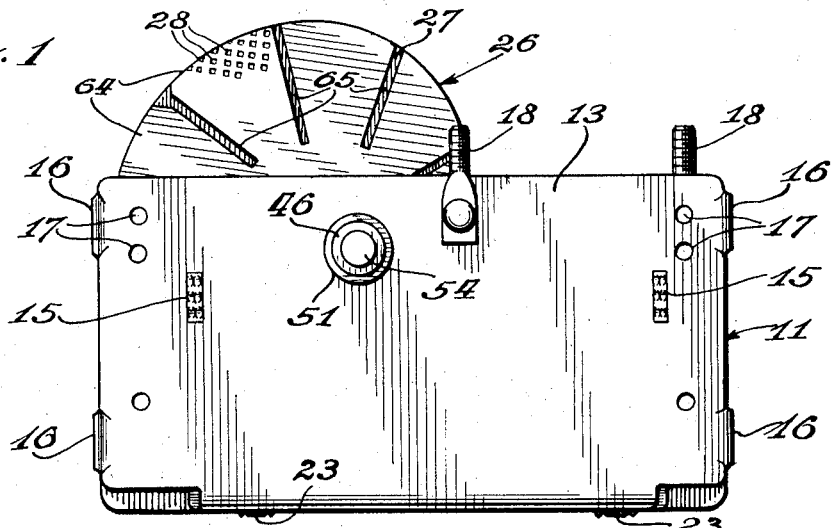

May 19, 1936.   P. G. JACOBSON   2,041,186
ELECTROSTATIC CONDENSER
Filed March 14, 1932   2 Sheets-Sheet 2
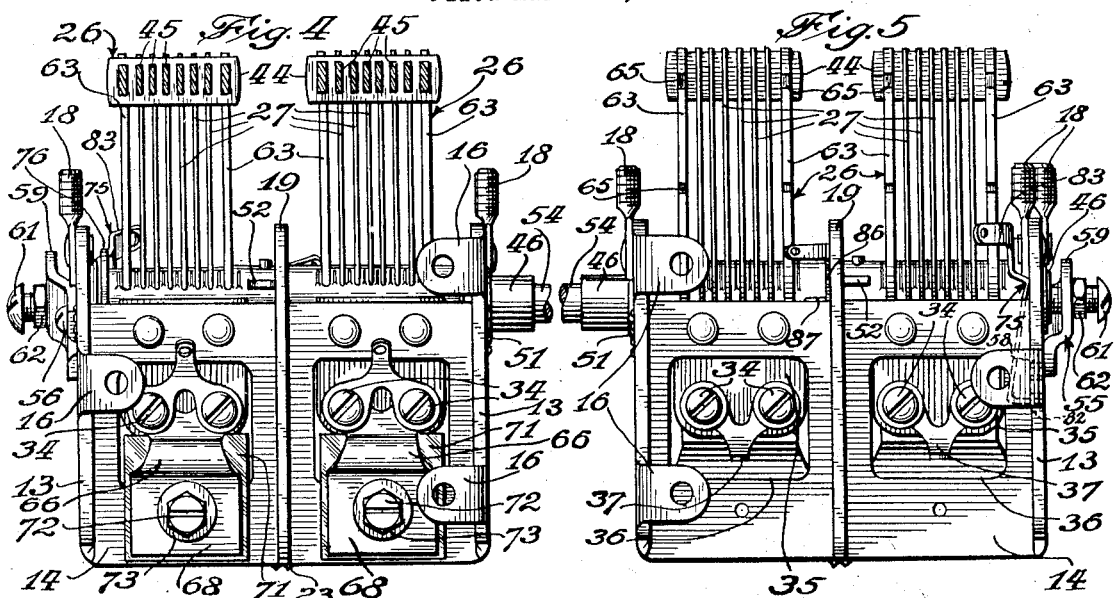
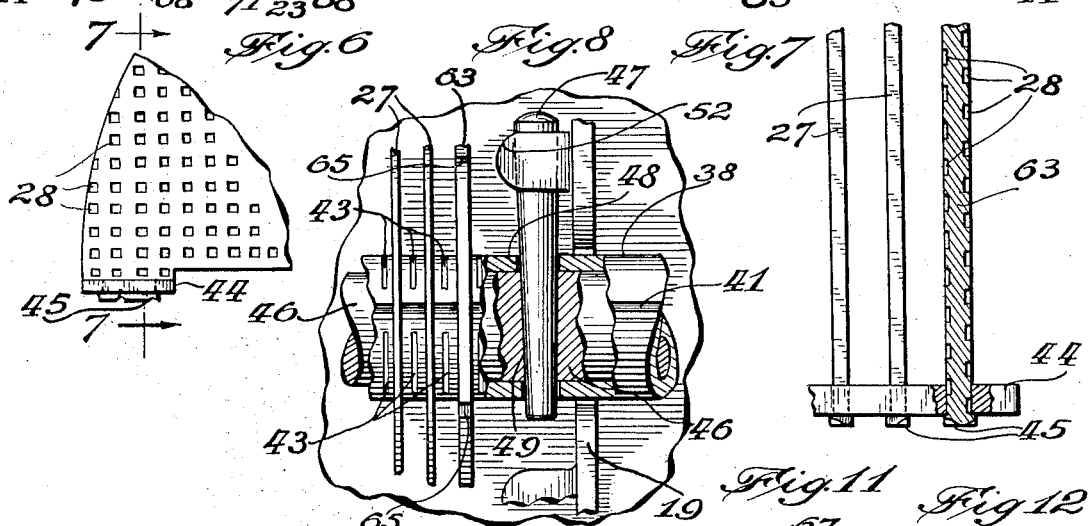
Inventor:
Peter G. Jacobson
By Williams, Bradbury,
McCaleb & Hinkle,
Attys.

Patented May 19, 1936

2,041,186

UNITED STATES PATENT OFFICE 2,041,186

ELECTROSTATIC CONDENSER

Peter G. Jacobson, Chicago, Ill.

Application March 14, 1932, Serial No. 598,579

1 Claim. (Cl. 175—41.5)

This invention relates to electrostatic condensers of the continuously variable capacity type, and has for an object improvements in structure and design which result in a sturdier, more accurate and more reliable condenser of the straight line resonance curve type, and in other objects to be more specifically pointed out below.

It is a particular object of my invention to provide either a single or multi-unit condenser having a frame or chassis, including end and side members, stamped from a single piece of stock.

Another object lies in the provision of a novel stator plate tie bar which obviates the necessity for floating ties or anchorages for the stator plates, and renders the stator assembly more rigid.

A further and highly important object of my invention is an improved condenser plate structure which renders the capacity characteristic and setting of the condenser more constant by preventing vibration of the plates, and further by preventing the collection of superficial dust layers on both stator and rotor plates.

Still another object of my invention is the provision of a simple and efficient capacity balancing or trimming means in the form of small auxiliary condensers utilizing the condenser frame as one capacity surface or condenser plate.

A further object is the provision of an improved, combination riding contact and friction member for the rotor shaft.

A still further object is a combination stop and keying (shimming) pin for the rotor shaft.

Another object is the provision of a novel and efficient end thrust adjustment for the rotor shaft.

Other objects of the invention reside in an improved means for mounting the rotor plates on the rotor shaft, in affixing the stator plates to their tie bars, and in the provision of conveniently distributed connection and mounting lugs over the condenser frame, and also in the provision of a novel combined friction and constant-ground-potential or constant-impedance rider contact for the rotor shaft, and other structural improvements hereinafter more fully described and illustrated by the drawings, in which:

Fig. 1 is a front elevation of a condenser assembly embodying the features of my invention;

Fig. 2 is a sectional elevation of my novel condenser with the front plate and a portion of the rotor assembly cut away, particularly showing the stator plate and frame structure of one of the capacity units;

Fig. 3 is a plan view of the condenser unit shown in Fig. 2;

Fig. 4 is a side elevation of the condenser of my invention showing the balancing or trimming condensers affixed to the stator plate mounting blocks;

Fig. 5 is an elevation of the opposite side of the condenser to that shown in Fig. 4, showing the stator plate mounting blocks;

Fig. 6 is an enlarged fragment of a condenser plate showing the reinforcing indentations;

Fig. 7 is an enlarged partial view of the rotor plates showing in section the relatively greater thickness of the end plate, and the staggering of indentations in such plate;

Fig. 8 is an enlarged fragmentary view of the rotor shaft and the stop pin and lugs;

Fig. 9 is a perspective of the combined shaft end, friction and contact rider;

Fig. 10 is a perspective of the friction contact rider; and

Figs. 11 and 12 are details of the trimmer condenser.

Illustrative of my invention, the drawings show a variable condenser suitable for use in, but not limited to radio apparatus, and comprising a frame or chassis 11 die stamped or otherwise suitably formed to provide a bottom wall 12, end walls 13 and side walls 14, the end and side walls being integral with and upstanding from the bottom wall 12. In forming the condenser frame 11, assembly tabs or lugs 15 are provided at each end of the side walls 14 and are clinched or spread apart after they are inserted in corresponding apertures in the end walls to lock the bottom, side and end walls into a unitary and rigid frame or chassis.

In the forming of the frame 11, any desired number of condenser mounting lugs 16 integral with the chassis or frame and mounting screw apertures 17 in the chassis are formed to adapt it for universal mounting. These lugs 16 and apertures 17 may be supplemented by a plurality of mounting or connection studs 18 riveted or otherwise suitably secured to the side walls 14. In this manner I provide mounting means which permit mounting my novel condenser in almost any position.

A partition plate or wall 19 for multi-unit condensers of my invention, has slots 21 beginning at a longitudinal edge and extending transversely of the plate. The slots receive the side walls 14 and the plate is secured in place by clinching or spreading the metal of the side walls at each side of the plate, as shown at 22 in Fig. 3, and by clinching or spreading tabs or lugs 23 on the plate 19 extending through the bottom wall 12. The partition plate is thus securely mounted and serves to reinforce the chassis or frame 11.

This sturdy unitary chassis or frame 11, serves as a mounting or support means for one or more rigidly assembled stators 24 having a plurality of spaced stator plates 25 and a rotor 26 having spaced rotor plates 27 interleaving with the stator plates 25 to form a variable capacitance. The plates 25 and 27 are provided with indentations 28 arranged in staggered rows (see Fig. 7) at opposite sides of each plate to prevent sustained vibration.

The stator plates 25 are preferably die stamped to provide the indentations 28 and to provide radially extended or peripheral lugs 29 fitted into spaced holes in substantially U-shaped brackets 31 and clinched or deformed therein to secure each plate firmly to arms 32 and 33 of each bracket.

By means of this structure, the stator plates are properly spaced and firmly supported at more than one point by each mounting bracket, which serves dually as a tie bar and a mounting means, and which provides for a rigid plate suspension that is sufficient to obviate the necessity of floating tie bars and the like to prevent warping, bending and vibration, as are usually employed for such purpose in the mounting of stator plates.

These U-shaped brackets carrying the stator plates, are mounted or assembled, by means of screws 34, to insulating strips or blocks 35 riveted or otherwise suitably secured to opposite side walls 14 inwardly, adjacent apertures 36 provided in the side walls during the formation of the frame or chassis. The insulating blocks 35 serve to insulate the stator plates from the frame. Terminal or connecting lugs 37 may be mounted in the apertures 36 to the blocks 35 by, for example, the screws 34 securing one end of the stator mounting bracket 31 to the insulating blocks.

My rotor plate assembly may best be understood by referring to Figs. 2, 3 and 8. It comprises a tubular sleeve member 38 which is formed initially from a generally rectangular piece of metal having correspondingly spaced slots or apertures 39 at the opposite marginal portion, and which is subsequently formed about a cylindrical surface, the longitudinal edges being brought together to form a meeting or seam line 41 as shown in Figs. 2 and 8.

The portion of each rotor plate adapted to be secured to the sleeve 38 is initially provided with an arcuate slot 42, the marginal portion of which is engaged in a slot 39 at opposite sides of the seam line 41 and in the sleeve member 38. After each rotor plate 27 is positioned in a slot in the sleeve 38, the metal of the sleeve at opposite sides of the slots 39 or the rotor plates, is clinched or spread apart as shown at 43 in Fig. 8 to hold rotor plates in place spaced axially of the sleeve. Each set of rotor plates 27 is provided with a tie bar 44 secured to each plate at a point of greatest radial distance from its center of rotation by means of a tab or lug 45 integral with each plate and passing through a corresponding hole in the tie bar 44. The tie bar may be clinched or the metal thereof spread apart between each tab or lug 45, as in the case of the sleeve 38 and the rotor plates, or the tabs may be clinched or deformed in order to rigidly secure each rotor plate to the tie bar and to secure the rotor plates in the spaced relation provided by the slots or apertures 39 in the sleeve 38.

This rotor assembly facilitates inspection of and assembly and replacement in my novel condenser, and is carried on a shaft 46 slidably receivable in the sleeve 38. The sleeve is locked on the shaft by a combined stopping and keying pin 47 which properly aligns the rotor plates and arms or limits the rotation thereof. This pin, as shown in Fig. 8, is tapered and is adapted to be inserted into aligned holes 48 and 49 in the sleeve 38 and shaft 46, respectively, after the shaft carrying the rotor plate assembly has been journaled or seated in bearings 51 carried in opposite end walls 13 of the chassis or frame.

Stopping lugs 52 are punched or struck out of the partition plate or wall 19 on each side of an arcuate slot 53 provided in the partition wall to accommodate the rotor shaft assembly. These lugs 52 are adjustable and may be bent to adjust the position of engagement between the lugs and the pin 47 in order to stop or limit the rotation of the shaft and the rotor plate assembly. The shaft 46 may be suitably reduced as at 54 to accommodate a suitable condenser driving or rotating means, not shown.

The rotor plates are shaped as shown in Figs. 1 and 2, for eccentric movement to provide a substantially straight line resonance curve within the limits of a given tuning band or wave length range as the plates are eccentrically moved between, for example, 0° and 180°.

During the first portion of the rotation of the plates 27, the resonance curve of this condenser when employed with a suitable inductance, corresponds to a straight line frequency variation, while that portion of the curve during the remainder of the rotor plate rotation corresponds to a straight line wave length variation.

In terms of capacitance, the characteristic capacitance curve of my condenser changes gradually for the first 90° of rotation, and thereafter changes with relatively great rapidity. This results in distributing desired resonance points more uniformly over any tuning dials which may be used with the condenser and avoids the usual crowding of higher frequencies at one end of the dial, thereby greatly increasing selectivity and permitting uniform calibration of such a tuning dial. These features are of great importance where the condenser is used to resonate radio receiving circuits and the like.

The rotor assembly is adjustably held against displacement axially of the shaft 46 by an end thrust member or bearing 55 affixed to the end wall 13 opposite the reduced end 54 of the shaft by a screw 56 and by a finger or lug 57 engaging in an aperture 58 in the chassis. The lug 57 is integral with a strip of metal having its other end 59 offset, and carrying an adjustment screw 61 engaging the end of the shaft 46 to limit the axial movement thereof. A lock nut 62 on the screw 61 permits the locking of the screw in an adjusted position.

In order to further provide against vibration and dislocation of the condenser plates, and to make a more rigid rotor plate assembly, I provide the end plates 63 of each rotor set of greater thickness than the plates therebetween (see Fig. 7). These end plates 63 are divided into a plurality of segments 64 by radial slots 65 in order to facilitate balancing the condenser assembly with an oscillator or the like, for the purpose of straightening out the resonance curve. This balancing of the condenser may be effected by bending the segments 64 toward or away from the intermediate plate.

In order to balance or match the capacities of the multi-unit condensers, I provide as shown more particularly in Fig. 4, a balancing or trimming condenser utilizing the side wall of the chassis opposite the terminal lugs 37 as a conducting surface for trimmer condensers. The other conducting plate of each trimmer condenser is in the form of a metal tab 66 having mounting lugs 67 at one end, a rectangular condenser plate 68 connected to the lugs 67 by means of an intermediate resilient bead 69. The mounting lugs 67 extend into an aperture 36 and are secured to the insulating block 35 by means of the stator mounting screws 34. Suitable insulating medium 71, such, for example as mica, is provided between the trimmer condenser plate and the side wall of the chassis, the mica being held in place by trimmer adjustment screws 72 insulated from the trimmer plates by means of insulating washers 73. These screws extend through the trimmer condenser plates 68 into threaded holes 74 in the chassis side wall so that by manipulation of the screws, the trimmer condenser plates may be brought into varying proximity with the underlying conducting surface of the chassis to vary the capacity of the trimmer condenser.

The trimmer condenser plates 68 are connected by means of the mounting screws 34 to the stator plates of the main condenser units, whereas the chassis or the other plate of the trimmer condenser is connected to the rotor plates. The mica insulation 71 prevents short-circuiting the entire condenser unit.

A combined friction and contact rider 75 comprising a strip of resilient conductor metal such as phosphor bronze having a hub or enlarged portion 76 intermediate oppositely disposed arms 76 and 78, is carried on the shaft 46 between the end of the sleeve 38 and the end wall 13, the shaft passing through a shaft aperture 79 provided in the hub portion 76 for this purpose. The arm 77 of the rider 75 has a finger or lug 81 at an end thereof for engaging in an aperture 82 in the end wall 13 to prevent the rider from rotating or rocking with the rotor. The other arm 78 of the rider has an offset portion 83 which may serve as a connection terminal for the rotor assembly. The portion of the metal rider 75 between the lug 81 and the offset portion 83 is given a bend or bow with the concave surface 84 thereof at the side toward the end plate 13 so that when the rider is assembled on the shaft, the rider resiliently presses against the end of the sleeve 38, preventing end play of, and assuring good electrical contact with the rotor.

If desired, a constant ground potential connection may be taken off of the rider at the terminal 83, but for this purpose I have provided an additional friction rider 85 (see Figs. 2 and 10) in the form of a strip having, as seen in Fig. 5, oppositely extending vertical and horizontal faces 86 and 87 of a resilient and an electrically conducting metal joined as an angle 88 intermediate the ends of the strip. Mounting holes 89 are provided in the angle face 86 intermediate the ends of the strip 85 for mounting the strip or rider on the partition wall 19 by means of rivets 91 or any other suitable mounting means. The horizontal face or member 87 has its end portion 92 crimped or curled longitudinally thereof and making a resilient, wiping contact with the sleeve 38, the opposite end of the rider being adapted to serve as a terminal lug for facilitating connecting the rider to ground.

Having thus described my invention, what I claim as new and desire to secure by Letters Patent of the United States, is:

In a variable condenser having a plurality of integral chassis members, a capacitance varying member including a shaft journaled at its ends in a pair of said chassis members, an end thrust bearing having a mounting arm secured to a said chassis member and an integral offset arm extending to adjacent an end of said shaft, and adjustment means carried by said offset arm coaxially with said shaft and adjustably engaging said shaft to limit the axial movement thereof.

PETER G. JACOBSON.